United States Patent
Losch et al.

(10) Patent No.: US 10,619,636 B2
(45) Date of Patent: Apr. 14, 2020

(54) COMPRESSOR

(71) Applicant: GEA Refrigeration Germany GmbH, Berlin (DE)

(72) Inventors: Stefan Losch, Berlin (DE); Thomas Nippert, Berlin (DE)

(73) Assignee: GEA REFRIGERATION GERMANY GMBH (DE)

( * ) Notice: Subject to any disclaimer, the term of this patent is extended or adjusted under 35 U.S.C. 154(b) by 37 days.

(21) Appl. No.: 15/102,347

(22) PCT Filed: Dec. 12, 2014

(86) PCT No.: PCT/EP2014/003348
§ 371 (c)(1),
(2) Date: Jun. 7, 2016

(87) PCT Pub. No.: WO2015/086161
PCT Pub. Date: Jun. 18, 2015

(65) Prior Publication Data
US 2016/0312779 A1 Oct. 27, 2016

(30) Foreign Application Priority Data
Dec. 12, 2013 (DE) ........................ 10 2013 020 532

(51) Int. Cl.
*F04C 29/02* (2006.01)
*F04C 27/02* (2006.01)
(Continued)

(52) U.S. Cl.
CPC .......... *F04C 18/16* (2013.01); *B01D 46/0002* (2013.01); *B01D 46/10* (2013.01);
(Continued)

(58) Field of Classification Search
CPC ........ F04C 18/16; F04C 27/02; F04C 29/026; F04C 29/028; Y10T 137/7481; F25B 31/002
(Continued)

(56) References Cited

U.S. PATENT DOCUMENTS 2,314,158 A * 3/1943 Peters ..................... F16K 31/32
137/398
4,478,054 A * 10/1984 Shaw .................... F04C 29/026
418/201.2
(Continued)

FOREIGN PATENT DOCUMENTS

DE 33 44 953 A1 6/1985
DE 60 2004 001 007 T2 4/2007
(Continued)

OTHER PUBLICATIONS

English translation of JP 57206191 by Espacenet, Mar. 12, 2018.*
(Continued)

*Primary Examiner* — Deming Wan
(74) *Attorney, Agent, or Firm* — Ostrolenk Faber LLP

(57) ABSTRACT

A screw compressor (10) comprising a compressing device (18), in particular, at least one screw-type rotor (20, 22), which feeds a compressed medium to an oil separation device (30). The oil separation device has a first volume (32), a second volume (34) and a separating device (36) that separates the first volume (32) and the second volume (34) from one another. The separating device (36) includes a demister (38) that is located in a first region of the separating device (36). A second region of the separating device (36) is designed as a partition (40) that has one or more oil communication openings (42).

10 Claims, 7 Drawing Sheets

(51) Int. Cl.
   *F04C 18/16* (2006.01)
   *F25B 31/00* (2006.01)
   *B01D 46/00* (2006.01)
   *B01D 46/10* (2006.01)

(52) U.S. Cl.
   CPC ............ *F04C 27/02* (2013.01); *F04C 29/026* (2013.01); *F04C 2210/10* (2013.01); *F04C 2210/14* (2013.01); *F04C 2240/806* (2013.01); *F04C 2240/809* (2013.01)

(58) Field of Classification Search
   USPC ...... 418/97, 206.8, 84, 201.1, 100, 104, 270
   See application file for complete search history.

(56) References Cited

U.S. PATENT DOCUMENTS 4,632,650 A      12/1986   Frieden et al. ................. 418/95
   6,183,227 B1 *   2/2001    Hida ..................... F04C 29/026
                                                            418/201.1
   2011/0182762 A1  7/2011    Feller et al. ............... 418/206.7

FOREIGN PATENT DOCUMENTS

DE   10 2008 036 317 A1   2/2010
   EP        0 540 459 A1    5/1993
   EP        1 471 258 B1    5/2006
   JP           56054987 A * 5/1981   ............ F04C 29/026
   JP           57206791 A * 12/1982  ............. F04C 29/02
   JP            H05-141371  6/1993
   WO      WO 2005/057014 A1 6/2005
   WO      WO 2010/012570 A2 2/2010

OTHER PUBLICATIONS

English translation of JP 56054987 by Espacenet May 14, 2019.*
Search Report dated Oct. 31, 2014 in corresponding German Application No. 10 2013 020 532.8.
International Search Report and Written Opinion dated Feb. 10, 2015 in corresponding PCT International Application No. PCT/EP2014/003348.

* cited by examiner

COMPRESSOR

CROSS-REFERENCE TO RELATED APPLICATIONS

The present application is a 35 U.S.C. §§ 371 national phase conversion of PCT/EP2014/003348, filed Dec. 12, 2014, which claims priority to German Patent Application No. 10 2013 020 532.8, filed Dec. 12, 2013, the contents of which are incorporated herein by reference. The PCT International Application was published in the German language.

TECHNICAL FIELD OF THE INVENTION

The present invention relates to a screw compressor.

BACKGROUND OF THE INVENTION

There are both screw compressors which operate in a dry running operating mode and screw compressors which operate in an oil-flooded operating mode. In the latter screw compressors, oil is used both as a lubricant and as a sealant during the compression operation itself. In order, however, to avoid any undesired oil ingress into a refrigeration unit which is supplied with compressed refrigerant by the compressor, an oil separator is as a rule provided on a high pressure side of screw compressors of this type.

According to the prior art, an oil separator of a semi-hermetic compact screw compressor consists of two spaces separated by a demistor made from knitted metal mesh. Compressed gas/oil mixture (refrigerant/oil mixture) passes from a pressure pipe into the first space, in which a pre-separation takes place, in particular at a bounding wall of the first space. Afterward, the gas flows with a reduced oil content and possibly oil which has already been separated and was recently entrained by the gas flow out of the first space through the demistor into the second space. The oil content in the gas is reduced further in the demistor. The remaining oil separation takes place in the second space.

In the described construction, however, the lower part of the demistor knitted mesh lies in the oil which has already been separated, and part of the oil is pulled upward by way of capillary forces and mixes again with the gas. Furthermore, in a manner which is dependent on operating conditions, the gas and oil phases in the knitted mesh have a different flow resistance and accordingly the oil level in the first and in the second space is of different height. As a result, the gas flows partially through the oil which has already been separated, and therefore the phases are mixed again.

SUMMARY OF THE INVENTION

Proceeding herefrom, it is the object of the present invention to specify a screw compressor which has an oil separation which is as efficient as possible.

This object is achieved by way of a screw compressor having the features of patent claim 1 disclosed herein.

According to said claim, the object which is set is achieved by way of a screw compressor having a compression apparatus, in particular at least one screw rotor, in which the compression apparatus feeds a compressed medium to an oil separation apparatus. The oil separation apparatus has a first volume, a second volume and a separation apparatus which separates the first and the second volume from one another and has a demistor for separating oil. The demistor is arranged in a first section of the separation apparatus which as a rule is a section which is arranged at the top during operation of the compressor, and a second section of the separation apparatus is configured as a separating wall which has one or more oil communication openings. During operation of the compressor, the section which is configured as a separating wall is as a rule arranged at the bottom in a region, in which an oil sump is also formed.

In order to avoid an oil saturation of the demistor knitted mesh as a result of capillary force effects, the demistor is configured according to the invention in such a way that it covers only an upper part of the oil separator cross section or the separation apparatus between the first volume and the second volume. Here, the lower part of the oil separator cross section is formed by a separating wall, for example made from metal sheet. This solution according to the invention achieves a situation where the demistor knitted mesh does not come into contact with the oil which has already been separated. In order to allow the oil which is separated in the first space to flow away into the second space, one or more oil communication openings is/are provided in the lower part of the separating wall.

In order to ensure that the oil level in the first and in the second space is of approximately identical height, the cross section and therefore the flow resistance of the oil communication openings should have a value which is as advantageous as possible. In the case of changing operating conditions, for example in the case of a variable volumetric flow as a result of a variable rotational speed of the screw rotor, the optimum cross section of the oil communication openings, at which an approximately identically high oil level is set in the first and in the second, can change. The oil communication openings can therefore optionally be configured with a variable cross section which is controlled by way of an oil level regulator.

BRIEF DESCRIPTION OF THE DRAWINGS

Further optional features of the invention are specified in the subclaims and the following description of the figures. The respective features which are described can be realized individually or in any desired combinations. Accordingly, the invention will be explained in the following text using exemplary embodiments with reference to the appended drawings, in which:

DESCRIPTION OF PREFERRED EMBODIMENTS

Figure 1:
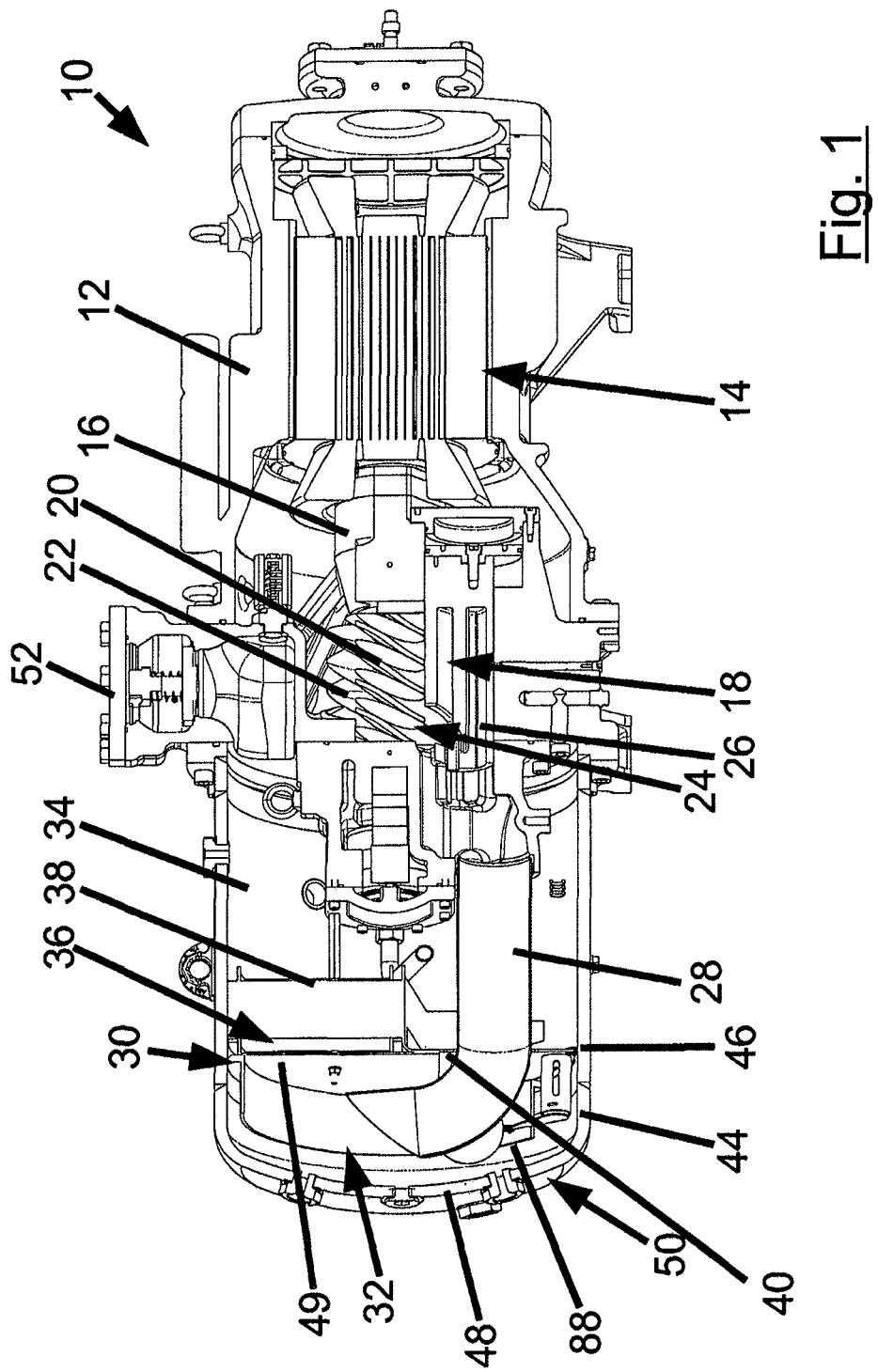
FIG. 1 shows a view of one exemplary embodiment of a compressor according to the invention.

FIG. 1 shows one possible embodiment of a compressor according to the invention, more precisely of a screw compressor 10 according to the invention which will also be called compressor 10 for short in the following text. The compressor 10 has a housing 12 and an electric motor 14 which is arranged in the housing 12. Furthermore, the compressor 10 has a drive shaft 16 and a compression apparatus 18 which has a screw rotor 20 and a second screw rotor 22 which is in engagement with the first screw rotor 20. The screw rotors 20, 22 are rotationally driven directly (indirectly in alternative embodiments, for example via a gear mechanism arrangement) via the drive shaft 16. As an alternative, a screw compressor 10 having only one screw rotor is also conceivable.

The first screw rotor 20 is arranged such that it can be rotated about a first rotational axis which is arranged in the axial direction. The second screw rotor 22 is arranged such that it can be rotated about a second rotational axis which extends parallel to the first rotational axis. Both the first and the second screw rotor 20, 22 are arranged in a compression space 24 which is of fluid-tight configuration at least in sections with respect to the surroundings and opens into a high pressure volume 26.

The compressor 10 of the described embodiment operates in an oil-flooded operating mode, in which oil which is situated in the compressor 10 is used both as lubricant and (for example, during the compression operation itself) and as a sealant. That is to say, the medium to be compressed, for example refrigerant, entrains oil, in particular in droplet form or as an aerosol, or is mixed with oil. After the compression operation which is brought about by way of the compression apparatus 18, the compressed medium/oil mixture (gas/oil mixture) is then fed via the high pressure volume 26 via a pressure pipe 28 to an oil separation apparatus 30.

To this end, the compressor 10 or the oil separation apparatus 30 of the compressor 10 has a first volume 32 in the form of a first chamber and a second volume 34 in the form of a second chamber, the first volume 32 and the second volume 34 being separated by way of a separation apparatus 36. The separation apparatus 36 has a demistor 38 which is arranged in a first section (as a rule, an upper section) of the separation apparatus 36. Furthermore, a second section (as a rule, a lower section) of the separation apparatus 36 is configured as a separating wall 40 or has a separating wall 40, the separating wall 40 having one or more (one in the embodiment which is described in the present text) cutouts in the form of one or more oil communication openings 42, through which oil can pass from the first volume 32 into the second volume 34, as a result of which an equalization of the oil level in the first volume 32 and in the second volume 34 is made possible. In alternative embodiments, the separating wall 40 does not have any oil communication openings 42.

An oil pre-separation from the compressed medium which consists of oil-conducting refrigerant in the described embodiment, as has already been mentioned in the above text, takes place in the first volume 32, in which oil on walls of the first volume 32 which has an approximately cylindrical housing side wall 44 which is delimited at a first end 46 by way of an end wall 48 and at a second end 50 which lies opposite the end wall 48 by way of the separation apparatus 36. Afterward, the refrigerant flows through a perforated plate 49 which is arranged upstream of the demistor in the flow direction and afterward flows through the demistor 38 which has a demistor knitted mesh for separating oil which is still situated in the refrigerant. Oil which is still entrained by the refrigerant is then separated from the refrigerant in the last separating operation in the second volume 34. From the second volume 34, the compressed medium passes to a compressor outlet 52, from where it is available for the respective desired application.

In the possible embodiment of a compressor according to the invention which is described and is shown in the figures, the separating wall 40 has the cutout, also called an oil communication opening 42. In alternative embodiments, the separating wall can have a plurality of oil communication openings 42. In order to set a desired oil quantity which flows through the oil communication opening 42, the oil separation apparatus 30 has a quantity setting apparatus 54 (cf. in this regard, in particular, FIGS. 5 and 7-9) for setting a quantity of the oil which can pass through the oil communication opening 42 in a defined time period. Accordingly, the flow rate is set, that is to say the oil quantity which passes through the oil communication opening 42 per unit time. In alternative embodiments, a plurality of oil communication openings 42 can be in operative engagement with one quantity setting apparatus 54 or else also with separate quantity setting apparatuses 54. It is also conceivable that one or more oil communication openings 42 is/are provided without a respectively associated quantity setting apparatus 54, and that additionally one or more further oil communication openings 42 is/are provided with a respectively associated quantity setting apparatus 54.

The quantity setting apparatus 54 which is shown in detail in FIGS. 3 to 9 has a first element in the form of a cylindrical hollow axle 56 and a second element in the form of a hub 58 of cylindrical configuration. The hollow axle 56 is arranged concentrically relative to the hub 58 and movably in the hollow axle 56. Here, the external diameter of the hub 58 corresponds approximately to the internal diameter of the hollow axle 56. The hollow axle 56 has a first cutout 62 which is arranged on a hollow axle cylindrical shell 60, and the hub 58 has a second cutout 66 which is arranged on a hub cylindrical shell 64, it being possible for the first cutout 62 and the second cutout 66 to be arranged so as to overlap congruently, so as to overlap partially or so as not to overlap by way of a relative movement (pivoting movement in the described embodiment) of the hollow axle 56 and the hub 58 with respect to one another.

The cutouts (openings) 62, 66 in the hollow axle 56 and the hub 58 can accordingly be arranged by way of the pivoting movement relative to one another in such a way that they release a maximum cross section as opening 68 (cf. in this regard FIG. 8, the cross section is identical to the size of the first or second cutout), that they release as opening any desired cross section which is defined by the degree of overlap and is smaller than the size of the first or the second cutout 60, 62 (cf. in this regard FIG. 7), or else also that they do not release any opening 68 (cf. in this regard FIG. 9), through which oil can pass into the interior of the first element in the form of the hub 58. The first cutout 62 and the second cutout 66 have the same size, but can also have different sizes in alternative embodiments.

While the hub 58 which is mounted in a liquid-tight manner in the hollow axle 56 and forms a hub/hollow axle arrangement 70 with the latter is closed in a liquid-tight manner on a first end side 72 of the hub/hollow axle arrangement 70, it is open on a second end side 74. On the second end side 74, the hub/hollow axle arrangement 70 is arranged in the first volume 32 (the first chamber) on or in the separating wall 40. In the embodiment which is described in the present case, the diameter of the oil communication opening 42 therefore corresponds approximately to the external diameter of the hollow axle 56, with the result that the quantity setting apparatus 54 can be introduced by way of its end which faces the separating wall 40 by means of a locating fit into the separating wall 40 and can be fastened there, that is to say welded (as an alternative, brazed or adhesively bonded or introduced by means of a press fit) in a correspondingly liquid-tight manner. As an alternative, it would be conceivable to bring the hollow axle 56 with its side which faces the separating wall 40 into contact with the separating wall 40 and then to attach a corresponding weld, brazed connection or adhesive bond. In this case, the oil communication opening 42 can be selected to be smaller than the external diameter of the hollow axle 56.

If a maximum cross section is released as opening in a first possible relative position of the hub 58 with respect to the hollow axle 56 (cf. in this regard FIG. 6, cross section is equal to the size of the first or second cutout), a maximum oil quantity can flow per unit time through the opening and afterward through the oil communication opening 42 from the first volume 32 into the second volume 34. If any desired cross section which is defined by the degree of the overlap and is smaller than the size of the first or the second cutout 62, 66 is released as opening (cf. in this regard FIG. 5), a predefined lower quantity of oil can flow per unit time from the first volume 32 into the second volume 34. If no opening exists on account of a non-existent overlap of the first and the second cutout 62, 66, no oil can pass from the first volume 32 into the second volume 34 (cf. in this regard FIG. 7).

In the terminology of the present application, the expression liquid-tight means sealed in such a way that liquids with a viscosity of the oil which is used or more viscous liquids cannot penetrate the corresponding seal or the corresponding closure. As an alternative, liquid-tight means, for other embodiments, sealed in such a way that no liquid can penetrate the corresponding seal or a corresponding closure.

For an adjustment of the degree of overlap of the first and the second cutout 62, 66, a lever 75 is arranged on the first end side 72 of the hub 58, which lever 75 has, at a first lever end 76 which faces away from the hub 58, a cutout in the form of a bore 78, to which a float 82 is attached. The lever 75 is connected rigidly to the hub 58 and therefore can be rotated or pivoted about its center axis like the hub 58 itself. Since the oil which is separated there collects at the bottom in the first volume 32 (owing to gravity), an oil accumulation (oil sump) is formed there, on which the float 80, more precisely a float body 82 of the float 80, floats. Depending on the accumulated oil quantity, the float body 82 is situated in a position which is situated closer to the underside of the compressor 10 (cf. in this regard FIG. 3) or in a position which is further away from the underside of the compressor 10 (cf. in this regard FIG. 4). This positional deflection leads to a deflection of the lever 75 and therefore to a setting of the degree of overlap of the first and the second cutout 62, 66.

Figure 3:
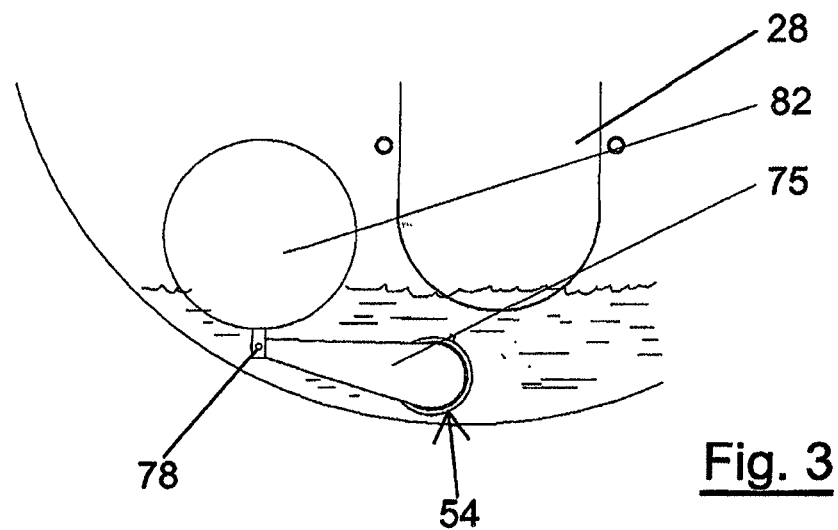
FIG. 3 shows a sectional view of a first volume of an oil separation apparatus having a quantity setting or flow limiting apparatus which is situated in a first position.
Figure 4:
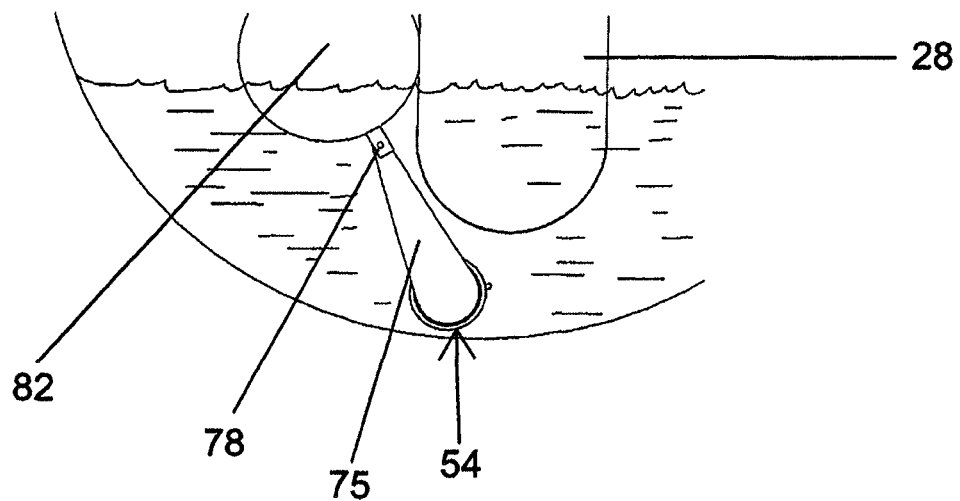
FIG. 4 shows the view from FIG. 3, the quantity setting apparatus being situated in a second position.
Figure 5:
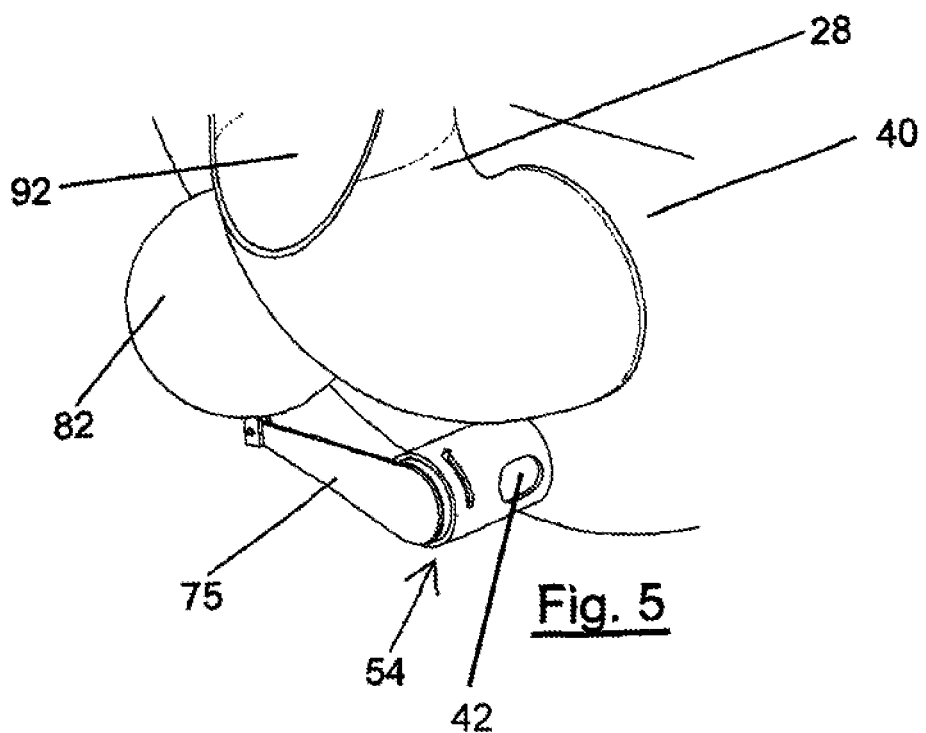
FIG. 5 shows the first volume in a perspective view without walls.
Figure 6:
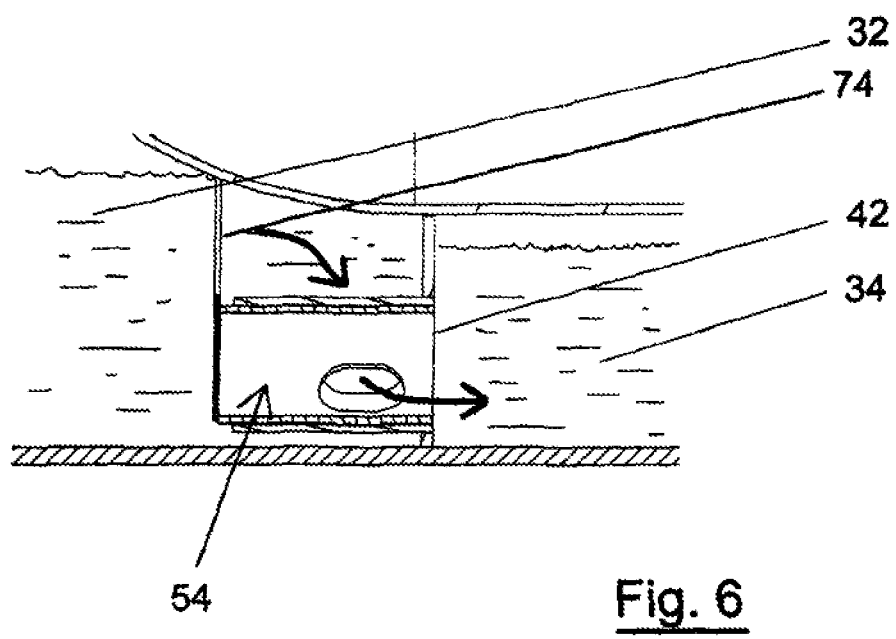
FIG. 6 shows a sectional view of a detail of the oil separation apparatus.
Figure 7:
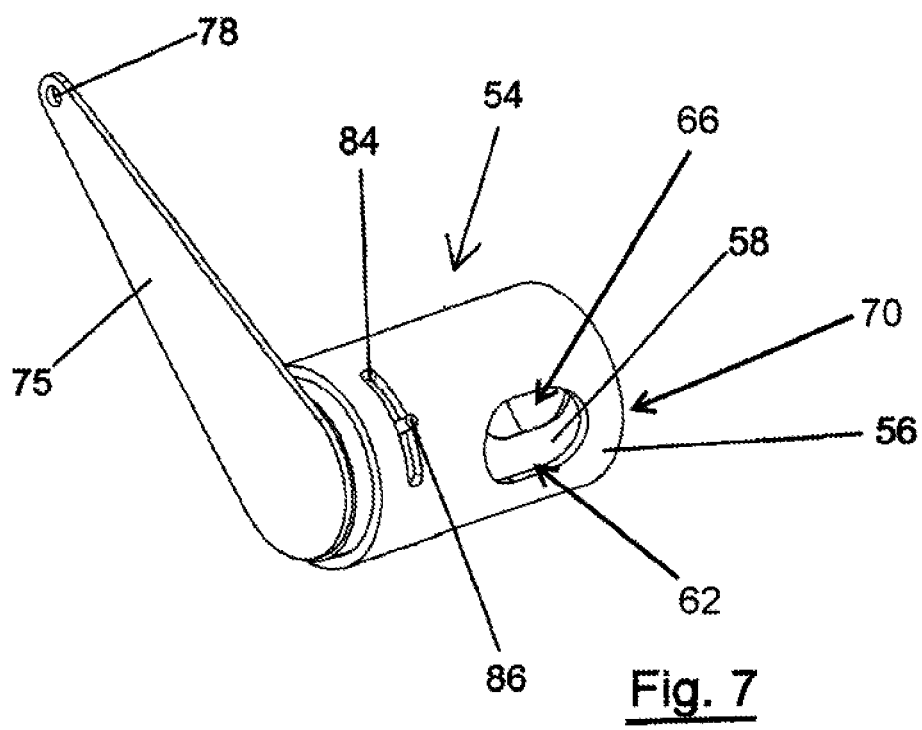
FIG. 7 shows the quantity setting apparatus in an intermediate position.
Figure 8:
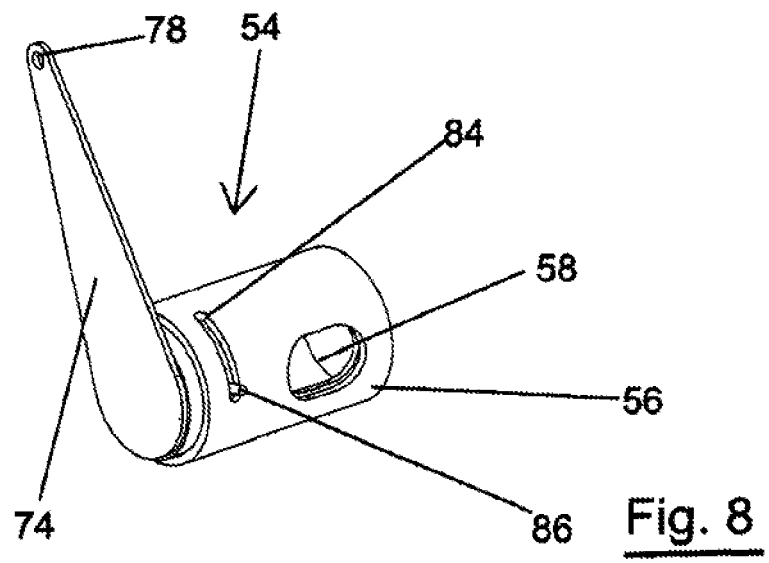
FIG. 8 shows the quantity setting apparatus in the second position.
Figure 9:
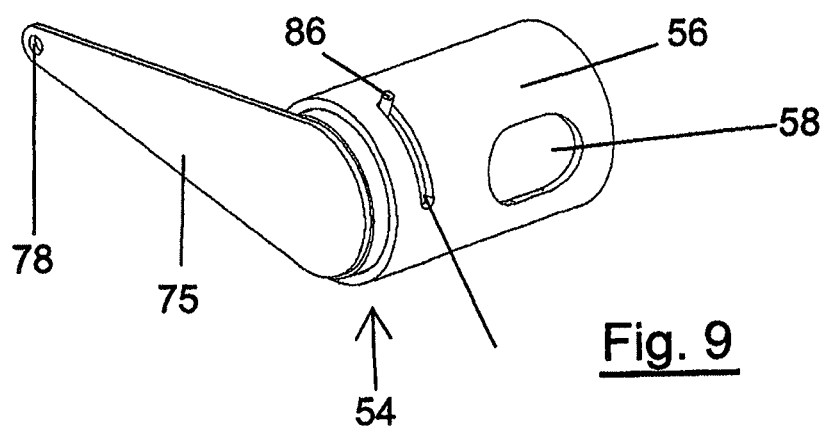
FIG. 9 shows the quantity setting apparatus in the first position.

Here, the position which is shown in FIG. 3 corresponds to the position which is shown in FIG. 9 of the lever 75 and therefore of the hub 58 relative to the hollow axle 56, it becoming clear from FIG. 9 that, in said position, the first and the second cutout 62, 66 do not overlap and therefore no oil can pass into the hub 58 and therefore through the oil communication opening 42. In contrast, the position which is shown in FIG. 4 corresponds to the position which is shown in FIG. 8 of the lever 75 and therefore of the hub 58 relative to the hollow axle 56, it becoming clear from FIG. 8 that, in said position, the first and the second cutout 62, 66 overlap completely and therefore a maximum opening is realized, through which oil can flow from the first volume 32 into the second volume 34.

Furthermore, the hollow axle 56 has a third cutout in the form of a slot 84, into which a corresponding pin-shaped projection 86 engages which is arranged on the outer wall of the hub 58 in a radially outwardly extending direction. In the embodiment which is described in the present text, the slot 84 is configured over an angular range of 55°, angular ranges of up to 75° and, as an alternative, up to 90° being conceivable in alternative embodiments. Therefore, the relative movement (the pivoting or rotating range) between the hollow axle 56 and the hub 58 is restricted to the stated angular range. In the embodiment which is described in the present text, the first element in the form of the hollow axle 56 and the second element in the form of the hub 58 are arranged so as to be in engagement with one another, a third cutout, in the form of the slot 84 in the present embodiment, being provided on one of the two elements, namely the hollow axle 56 or the hub 58, into which third cutout a guide element which is arranged on the other element, namely the hub 58 or the hollow axle 56, in the form of the pin-shaped projection or pin 86 in the present embodiment, engages in such a way that the relative movement of the two elements (hollow axle 56 and hub 58) with respect to one another is limited, the first cutout 62 and the second cutout 66 being arranged so as to be congruent with respect to one another in the one end position, but the two cutouts 62, 66 being arranged so as to not overlap in the other end position.

Figure 1A:
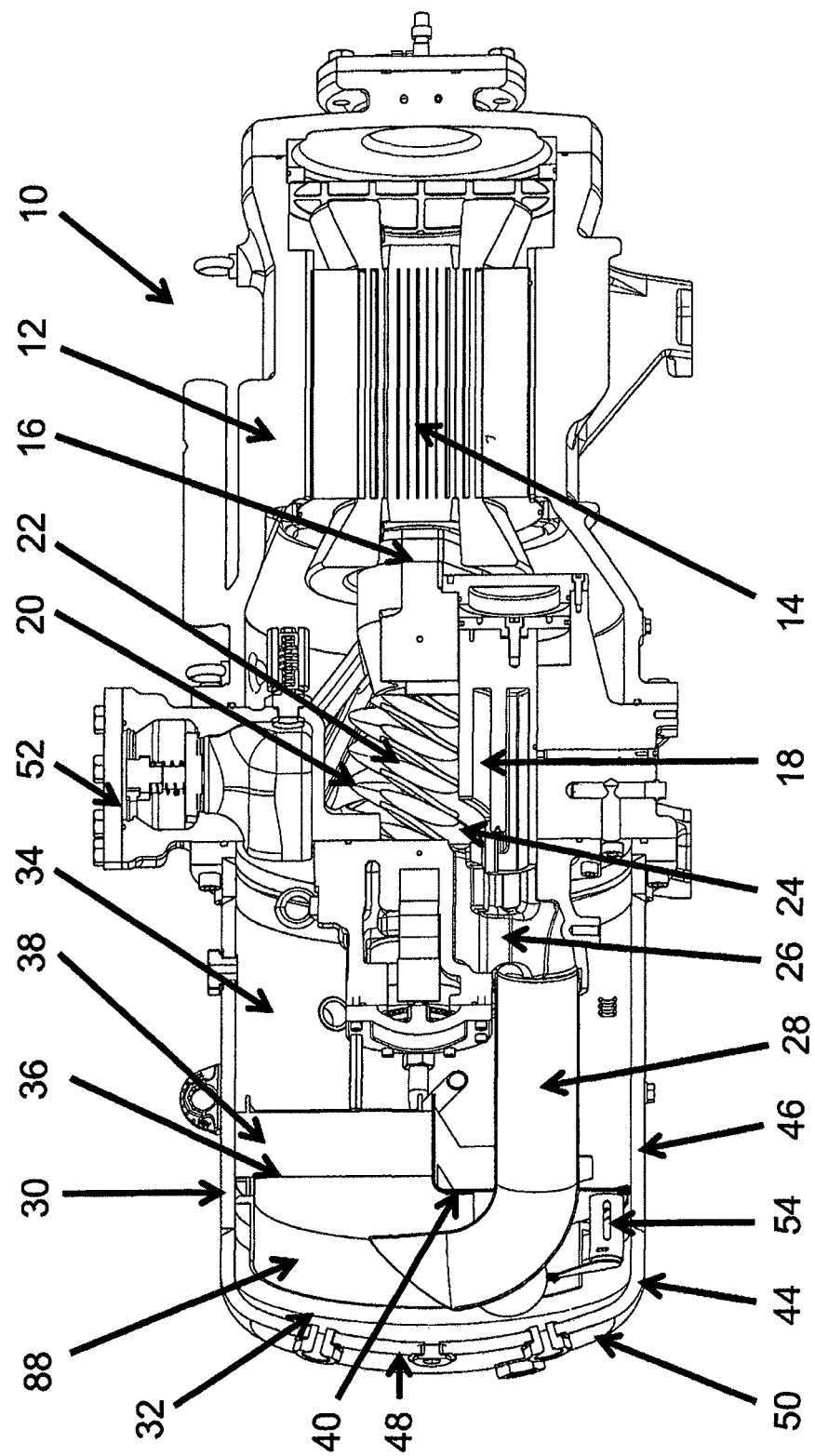
FIG. 1a shows a view of an alternative (second) embodiment of a compressor according to the invention.
Figure 2:
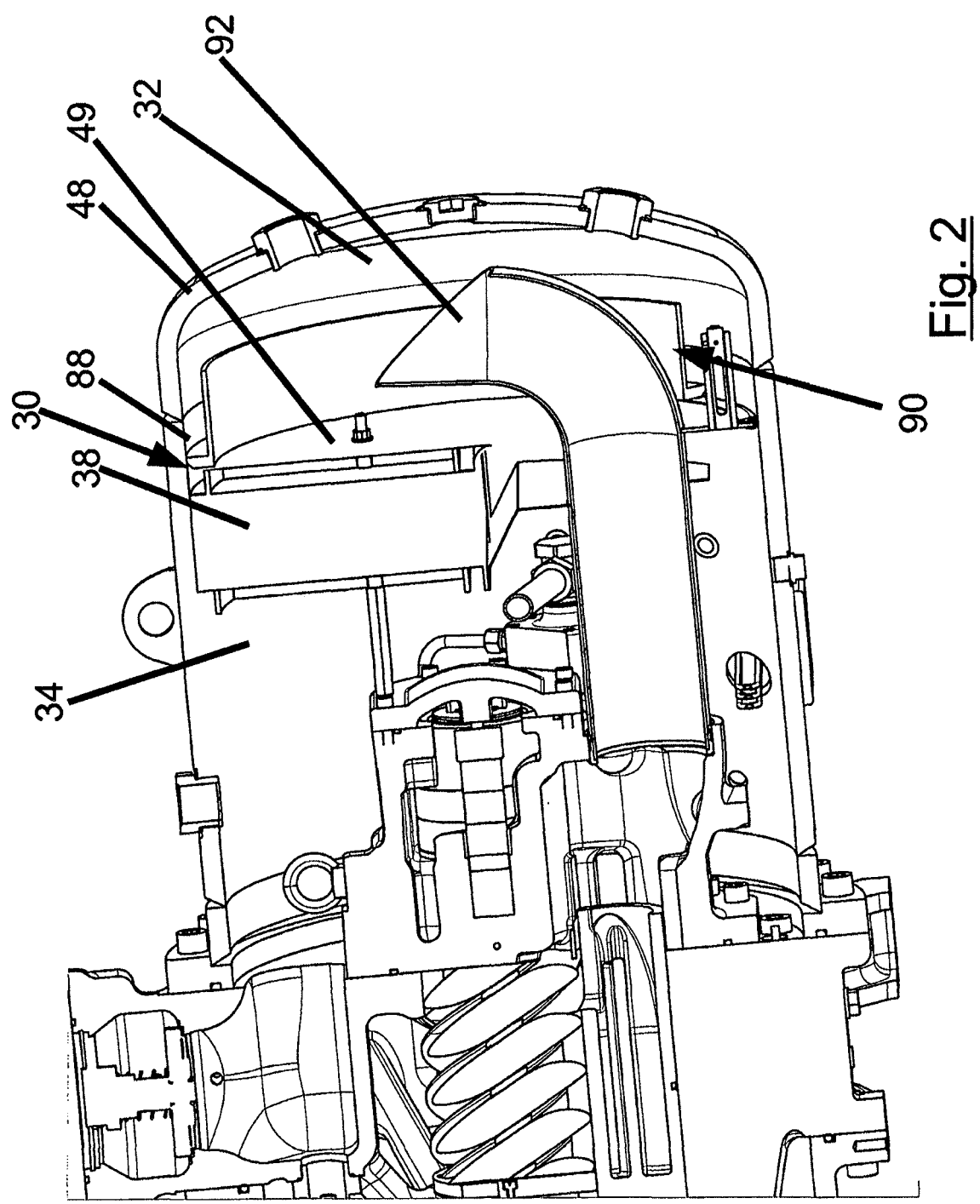
FIG. 2 shows an enlarged illustration of a part section from FIG. 1.

The alternative embodiment of FIG. 1a (second embodiment) is identical to the first embodiment with the exception that it does not have a perforated plate 49.

In summary, the above-described subject matter can be summarized as follows, in other words: a housing of the oil separation apparatus 30 is divided by way of a separating wall 40 into a first volume 32 and a second volume 34 (a first space and a second space). The separating wall 40 has an opening, called an oil communication opening 42 in the above text, through which oil can flow from the first space into the second space. A hollow axle 56, the external diameter of which corresponds to the diameter of the opening 42, is fastened to the separating wall 40 in a manner which is fitted into said opening 42. The hollow axle 56 serves as an axle, about which a float insert or float 80 is arranged rotatably. The float insert consists of a lever 75 which is fastened to a hub 58. The hub 58 is configured as a tube, the internal diameter of the hub 58 being approximately the same size as the external diameter of the hollow axle 56. A pin 86 is arranged on the hollow axle 56 in such a way that it engages into a slit (cutout or slot 84) in the hub 56 in such a way that firstly the float insert scarcely has axial movement capability on the hollow axle 56 and secondly the pivoting movement of the float insert about the hollow axle 56 is limited to an angle which is 55° in the stated example, and that said pivoting movement by way of the pin 86 has two end stops.

A float ball (float body 82) is arranged at the outer end of the lever 75. In a manner which is dependent on the filling level of the oil in the first volume 32, the lever 75 of the float insert is pivoted upward or downward by way of the float ball which floats on the oil.

A transverse bore in the hollow axle 56 (first cutout 62) and a transverse bore in the hub 58 (second cutout 66) of the float insert are arranged in such a way that they overlap one another coaxially when the float insert is pivoted into the upper end position. Therefore, oil can flow by way of the full cross section from the first volume 32 through the transverse bore in the hub 58, through the transverse bore in the hollow axle 56, through the hollow axle 56 and the opening 42 in the separating wall 40 into the second volume 34. If the float insert is pivoted downward from the upper end position, the overlap of the transverse bore in the hollow axle 56 and the transverse bore in the hub 58 is decreased continuously, with the result that the cross section, through which oil can flow from the first volume 32 into the second volume 34, is reduced more and more. If the float insert is pivoted into the lower end position, there is no overlap of the transverse bore in the hollow axle 56 and the transverse bore in the hub 58, with the result that there is no more cross section, through which oil can flow from the first volume 32 into the second volume 34.

In order to prevent oil that has already been separated at the housing side wall 44 and the end wall 48 from being entrained again by the flowing compressed medium, an oil discharge apparatus or oil outflow apparatus 88 is arranged on the separation apparatus 36.

Further oil which is mixed with the flowing compressed medium is then separated when passing through the demistor 38 which, for this purpose, has a metal knitted mesh or metal braid which is arranged in the region, through which flow passes. It is to be noted at this point that, for example, a lamella construction would also be conceivable instead of a metal or wire knitted mesh. A metal or wire knitted mesh ensures a construction which is insusceptible to faults and has a long service life, however.

As has been mentioned in the above text, the first volume 32 is of approximately cylindrical configuration, with the result that the separating wall 40 with the demistor 38 has approximately a circular basic area. As an alternative, other configurations (rectangular, hexagonal or octagonal or provided with a large number of corners) are also conceivable; the approximately circular configuration is often to be preferred, in particular, for pressure vessels. The oil discharge apparatus 88 is of channel-shaped configuration and extends from a radially outer end of the separation apparatus 36 inward.

The oil discharge apparatus 88 which is configured in the form of a channel has a border 90, in particular wall, which is configured with an approximately L-shaped cross section, is arranged on the separation apparatus 36, on the separating wall 40 in the embodiment which is described in the above text, and is in contact with the (inner side of the) housing side wall 44 which forms a lateral border of the oil discharge apparatus 88, with the result that the latter overall has a channel shape (an approximately U-shaped cross section). The oil discharge apparatus 88 extends over a segment-like section, more precisely a circular segment-like section of the separating wall 40. Where the oil discharge apparatus 88 is not configured, the oil which accumulates therein can run off into an oil sump which is situated in the compressor. That is to say, the oil discharge apparatus 88 is not configured or is cut out on a side which is situated at the bottom during operation of the compressor 10 in a (circular) sector of from 40° to 90°, preferably of from 60° to 80° inclusive. That is to say, in other words, the oil discharge apparatus 88 has a sector angle of from 250° to 320°, preferably from 280° to 300°. In the specifically described embodiment, the sector angle is 290°.

It is to be noted at this point that, in alternative embodiments, the oil discharge apparatus 88 can also be configured on the separating wall 40 and/or the demistor 38, for example as a depression or else in the form of a location of reduced material accumulation, for example a groove. The embodiment which is described in the above text ensures an effective construction, however, in which an optimum oil discharge is ensured.

It remains to be mentioned that the pressure pipe 28 for feeding the compressed medium which extends into the first volume 32 has a 90° bend in said first volume and is beveled at its outlet 92 toward the side which faces away from the separation apparatus 36, with the result that as great an inner wall region of the first volume 32 as possible is subjected to flow. This facilitates the oil pre-separation.

Although the invention is described using embodiments with fixed combinations of features, it also comprises the conceivable further advantageous combinations, however, as specified, in particular but not exhaustively, by the subclaims. All of the features which are disclosed in the application documents are claimed as being essential to the invention, insofar as they are novel over the prior art individually or in combination.

LIST OF DESIGNATIONS

10 Compressor
12 Housing
14 Electric motor
16 Drive shaft
18 Compression apparatus
20 First screw rotor
22 Second screw rotor
24 Compression space
26 High pressure volume
28 Pressure pipe
30 Oil separation apparatus
32 First volume
34 Second volume
36 Separation apparatus
38 Demistor
40 Separating wall
42 Oil communication opening
44 Housing side wall
46 First end of the housing side wall 44
48 End wall
49 Perforated plate
50 Second end of the housing side wall 44
52 Compressor outlet
54 Quantity setting apparatus
56 Hollow axle
58 Hub
60 Hollow axle cylindrical shell
62 Cutout
64 Hub cylindrical shell
66 Cutout
68 Opening
70 Hub/hollow axle arrangement
72 First end side of the hub/hollow axle arrangement
74 Second end side of the hub/hollow axle arrangement
75 Lever
76 First lever end
78 Bore
80 Float
82 Float body
84 Slot
86 Pin-shaped projection
88 Oil discharge apparatus
90 Border or wall
92 Outlet of the pressure pipe 28

The invention claimed is:

1. A screw compressor having a compression apparatus, in particular, at least one screw rotor, an oil separation apparatus that defines a first volume, and a second volume, a wall extending from the first volume to the second volume, the oil separation apparatus having a first section that includes a demistor and a second section, the demistor being located between the first and the second volume, wherein, during operation of the screw compressor, the at least one screw rotor feeds a compressed medium containing gas and oil to the first volume and to the second volume directly through the demistor, and wherein the demistor is arranged in a first, upper section of the separation apparatus spaced above a location that collects oil and is adjacent the first volume and the second volume, wherein the second section of the separation apparatus, which is a lower section of the separation apparatus relative to the first upper section, is configured as a separating wall that extends from the wall extending from the first volume to the second volume, the separating wall being adjacent a first location that collects oil in the first volume and adjacent a second location that collects oil in the second volume, and the separating wall being adjacent the first volume and the second volume, and wherein the separating wall has one or more oil communication openings to allow passage of oil from the first location to the second location to permit equalization of oil level in the first volume and in the second volume.

2. The compressor as claimed in claim 1, wherein, for the at least one oil communication opening, the compressor has a quantity setting apparatus or volumetric flow setting apparatus for setting a quantity or a volumetric flow of a medium which flows through the oil communication opening.

3. The compressor as claimed in claim 2, wherein the quantity setting apparatus has a first and a second element, the first element being arranged such that it can be moved relative to the second element, the first element having a first cutout, and the second element having a second cutout, it being possible for the first cutout and the second cutout to be arranged so as to be congruent with respect to one another, so as to overlap or so as not to overlap by way of a relative movement of the two elements.

4. The compressor as claimed in claim 3, wherein the first cutout and the second cutout are of the same size.

5. The compressor as claimed in claim 3, wherein the first element and the second element are arranged so as to be in engagement at least partially in one another or with one another, a third cutout being provided on one of the two elements, into the third cutout which is arranged on the other element engages.

6. The compressor as claimed in claim 3, wherein the quantity setting apparatus is arranged on the separating wall or is fitted into the latter.

7. The compressor as claimed in claim 3, wherein the first element and the second element are arranged so as to be in engagement with one another, a third cutout, preferably a slot, being provided on one of the two elements, into the third cutout which is arranged on the other of the two elements, preferably a pin, engages in such a way that the relative movement of the two elements with respect to one another is limited, the first cutout and the second cutout being arranged so as to be congruent with respect to one another in the one end position, but the first and the second cutouts being arranged so as to not overlap in the other end position.

8. The compressor as claimed in claim 2, wherein the quantity setting apparatus has a cylindrical hollow axle which has a hollow axle cylindrical shell and a first cutout which is arranged on the hollow axle cylindrical shell, and has a hub which is of cylindrical configuration, which is arranged at least partially in the hollow axle such that it can be rotated with respect to the latter, which the hub has a hub cylindrical shell and a the second cutout which is arranged on the hub cylindrical shell.

9. The compressor as claimed in claim 2, wherein the quantity setting apparatus has a float.

10. The compressor as claimed in claim 9, wherein the quantity setting apparatus has a lever which is in operative engagement with the float, the lever being in operative engagement with a first or a second element.

* * * * *